(12) United States Patent
Kondo (10) Patent No.: US 10,618,420 B2
(45) Date of Patent: Apr. 14, 2020

(54) ELECTRIC POWER SUPPLY CONTROL SYSTEM (71) Applicant: TOYOTA JIDOSHA KABUSHIKI KAISHA, Toyota-shi, Aichi-ken (JP)

(72) Inventor: Takayoshi Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 15/943,772

(22) Filed: Apr. 3, 2018

(65) Prior Publication Data

US 2018/0312077 A1 Nov. 1, 2018

(30) Foreign Application Priority Data

Apr. 28, 2017 (JP) .................................. 2017-089656

(51) Int. Cl.
*H02J 7/14* (2006.01)
*B60L 11/18* (2006.01)
(Continued)

(52) U.S. Cl.
CPC ........... *B60L 11/1874* (2013.01); *B60L 1/003* (2013.01); *B60L 3/0092* (2013.01); *B60L 58/20* (2019.02); *B60L 58/21* (2019.02); *B60L 58/22* (2019.02); *B60L 58/26* (2019.02); *B60R 16/033* (2013.01); *H02J 7/1423* (2013.01); *H02M 3/1584* (2013.01); *B60L 2210/12* (2013.01); *B60L 2240/36* (2013.01); *B60L 2240/527* (2013.01);
(Continued)

(58) Field of Classification Search
CPC ...... B60L 11/1874; B60L 58/22; B60L 58/21; B60L 58/26; B60L 1/003; H02J 7/1423; H02M 3/1584
USPC .......................................... 307/18, 9.1, 10.1
See application file for complete search history.

(56) References Cited

U.S. PATENT DOCUMENTS

| 7,205,681 B2 * | 4/2007 | Nguyen .................... H02J 1/10 307/18 |
| 2004/0164616 A1 * | 8/2004 | Obayashi ................. B60K 6/46 307/18 |

(Continued)

FOREIGN PATENT DOCUMENTS

| JP | 2008-278635 A | 11/2008 |
| JP | 2010-195056 A | 9/2010 |
| JP | 2014-230416 A | 12/2014 |

*Primary Examiner* — Hal Kaplan
*Assistant Examiner* — Swarna N Chowdhuri
(74) *Attorney, Agent, or Firm* — Oliff PLC (57) ABSTRACT

An electric power supply control system includes a plurality of electric power supply systems and a controller connected to the electric power supply systems. Each of the electric power supply systems includes a first secondary battery, a first load, a second secondary battery, a second load, and a DC-DC converter connected between the first secondary battery and the first load, and the second secondary battery and the second load. When a charge voltage of the first secondary battery of a first electric power supply system that is any one of the electric power supply systems becomes higher than the charge voltage of the first secondary battery of an electric power supply system other than the first electric power supply system by a predetermined voltage or more, the controller increases a level of output from a specific load in the first electric power supply system.

9 Claims, 8 Drawing Sheets (51) Int. Cl.
*B60R 16/033* (2006.01)
*H02M 3/158* (2006.01)
*B60L 58/26* (2019.01)
*B60L 58/22* (2019.01)
*B60L 1/00* (2006.01)
*B60L 58/20* (2019.01)
*B60L 58/21* (2019.01)
*B60L 3/00* (2019.01)
*H02M 3/156* (2006.01)

(52) U.S. Cl.
CPC ... *B60L 2240/545* (2013.01); *B60L 2240/547* (2013.01); *H01M 2220/20* (2013.01); *H02M 3/156* (2013.01)

(56) References Cited

U.S. PATENT DOCUMENTS

2008/0224663 A1* 9/2008 Mack .................... B60W 20/15
 320/132
2012/0299378 A1* 11/2012 King ...................... B60L 1/003
 307/18
2014/0244107 A1* 8/2014 Delevski ................. B60R 16/03
 701/36
2019/0263274 A1* 8/2019 Scolari .................... B60L 50/11

* cited by examiner

ELECTRIC POWER SUPPLY CONTROL SYSTEM

INCORPORATION BY REFERENCE

The disclosure of Japanese Patent Application No. 2017-089656 filed on Apr. 28, 2017 including the specification, drawings and abstract is incorporated herein by reference in its entirety.

BACKGROUND

1. Technical Field

The present disclosure relates to an electric power supply control system.

2. Description of Related Art

A technology for disposing a plurality of batteries having different voltages in an electric power supply control system mounted in a vehicle or the like is known in the related art. For example, a technology for disposing a high-voltage battery (48 V) and a low-voltage battery (12 V) in a vehicle electric power supply control system in order to step down the voltage of the high-voltage battery to the voltage of the low-voltage battery or step up the voltage of the low-voltage battery to the voltage of the high-voltage battery is disclosed in Japanese Unexamined Patent Application Publication No. 2014-230416 (JP 2014-230416 A).

SUMMARY

An electric power supply control system mounted in a vehicle or the like may employ a configuration that includes a plurality of independent electric power supply systems. In such a case, a difference in voltage may occur between the electric power supply systems depending on the state of deterioration of a battery, the component characteristic of a connected component, and the like. As a method for eliminating the difference in voltage, a generally considered method is increasing the voltage of an electric power supply system having a low voltage to the voltage of another electric power supply system by performing charging in accordance with the voltage of the electric power supply system having a low voltage. However, the method needs a time period for charging, and it is difficult to promptly eliminate the difference in voltage.

The present disclosure provides the ability to promptly eliminate a difference in voltage between a plurality of electric power supply systems by performing a suitable battery charging control in an electric power supply control system.

An aspect of the present disclosure relates to an electric power supply control system that includes a plurality of electric power supply systems and a controller connected to the electric power supply systems. Each of the electric power supply systems includes a first secondary battery configured to supply electric power of a first voltage, a first load configured to operate using the electric power supplied from the first secondary battery, a second secondary battery configured to supply electric power of a second voltage that is a voltage lower than the first voltage, a second load configured to operate using the electric power supplied from the second secondary battery, and a DC-DC converter connected between i) the first secondary battery and the first load, and ii) the second secondary battery and the second load. When a charge voltage of the first secondary battery of a first electric power supply system that is any one of the electric power supply systems becomes higher than the charge voltage of the first secondary battery of an electric power supply system other than the first electric power supply system by a first predetermined voltage or more, the controller is configured to increase a level of output from a specific load in the first electric power supply system.

Accordingly, the amount of electric power of the first secondary battery consumed by the specific load is increased in the first electric power supply system that is one of the electric power supply systems. Thus, consumption of the electric power of the first secondary battery can be promoted, and the voltage of the first secondary battery can be promptly decreased. Therefore, the difference in voltage between the charge voltage of the first secondary battery of the first electric power supply system and the charge voltage of the first secondary battery of the electric power supply system other than the first electric power supply system can be promptly eliminated.

In the electric power supply control system according to the aspect of the present disclosure, when a charge voltage of the first secondary battery of a second electric power supply system that is any one of the electric power supply systems becomes lower than the charge voltage of the first secondary battery of an electric power supply system other than the second electric power supply system by a predetermined voltage or more, the controller may be configured to decrease the level of output from a specific load in the second electric power supply system.

Accordingly, the amount of electric power of the first secondary battery consumed by the specific load is decreased in the second electric power supply system that is any one of the electric power supply systems. Thus, charging of the first secondary battery can be promoted, and the voltage of the first secondary battery can be promptly increased. Therefore, the difference in voltage between the charge voltage of the first secondary battery of the second electric power supply system and the charge voltage of the first secondary battery of the electric power supply system other than the second electric power supply system can be promptly eliminated.

In the electric power supply control system according to the aspect of the present disclosure, the specific load may be a cooling fan. When a temperature of a cooling target to be cooled by the cooling fan exceeds a predetermined threshold after a level of output from the cooling fan is decreased, the controller may be configured to increase the level of output from the cooling fan.

Accordingly, even when the temperature of the cooling target is increased by decreasing the level of output from the cooling fan, the temperature of the cooling target can be decreased again by increasing the level of output from the cooling fan. Therefore, overheating of the cooling target can be suppressed.

In the electric power supply control system according to the aspect of the present disclosure, the specific load may be a cooling fan. When a temperature of a cooling target to be cooled by the cooling fan exceeds a predetermined threshold after output from the cooling fan is stopped, the controller may be configured to start output from the cooling fan.

In the electric power supply control system according to the aspect of the present disclosure, when a charge voltage of the first secondary battery of a second electric power supply system that is any one of the electric power supply systems becomes lower than the charge voltage of the first secondary battery of an electric power supply system other than the second electric power supply system by a third predetermined voltage or more, the controller may be configured to decrease a level of output from the DC-DC converter in the second electric power supply system.

Accordingly, the electric power of the first secondary battery is not supplied to the second secondary battery and the second load in the second electric power supply system that is any one of the electric power supply systems. Thus, charging of the first secondary battery can be promoted, and the voltage of the first secondary battery can be promptly increased. Therefore, the difference in voltage between the charge voltage of the first secondary battery of the electric power supply system and the charge voltage of the first secondary battery of an electric power supply system other than the electric power supply system can be promptly eliminated.

In the electric power supply control system according to the aspect of the present disclosure, when a charge percentage of the second secondary battery connected to the DC-DC converter is lower than a predetermined threshold after the level of output from the DC-DC converter is decreased, the controller may be configured to increase the level of output from the DC-DC converter.

Accordingly, even when the charge percentage of the second secondary battery is decreased by decreasing the level of output from the DC-DC converter, the charge percentage of the second secondary battery can be increased again by increasing the level of output from the DC-DC converter. Therefore, the second secondary battery can maintain a sufficient amount of electric power for operating the second load.

In the electric power supply control system according to the aspect of the present disclosure, the first load may be a medium-voltage load that operates using electric power of a medium voltage. The second load may be a low-voltage load that operates using electric power of a lower voltage than the electric power of the medium voltage. The specific load may be disposed in a low-voltage system that includes the low-voltage load.

In the electric power supply control system according to the aspect of the present disclosure, the first load may be a medium-voltage load that operates using electric power of a medium voltage. The second load may be a low-voltage load that operates using electric power of a lower voltage than the electric power of the medium voltage. The specific load may be disposed in a medium-voltage system that includes the medium-voltage load.

The electric power supply control system according to the aspect of the present disclosure may further include a second DC-DC converter connected between the first secondary battery and the first load. The first load may be a high-voltage load that operates using electric power of a high voltage. The second load may be a low-voltage load that operates using electric power of a lower voltage than the electric power of the high voltage. The specific load may be disposed in a low-voltage system that includes the low-voltage load.

According to the aspect of the present disclosure, a suitable battery charging control can be performed in the electric power supply control system, and a difference in voltage between the electric power supply systems can be promptly eliminated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an electric power supply control system of an embodiment of the present disclosure will be described with reference to the drawings.

Configuration of Electric Power Supply Control system 10

Figure 1:
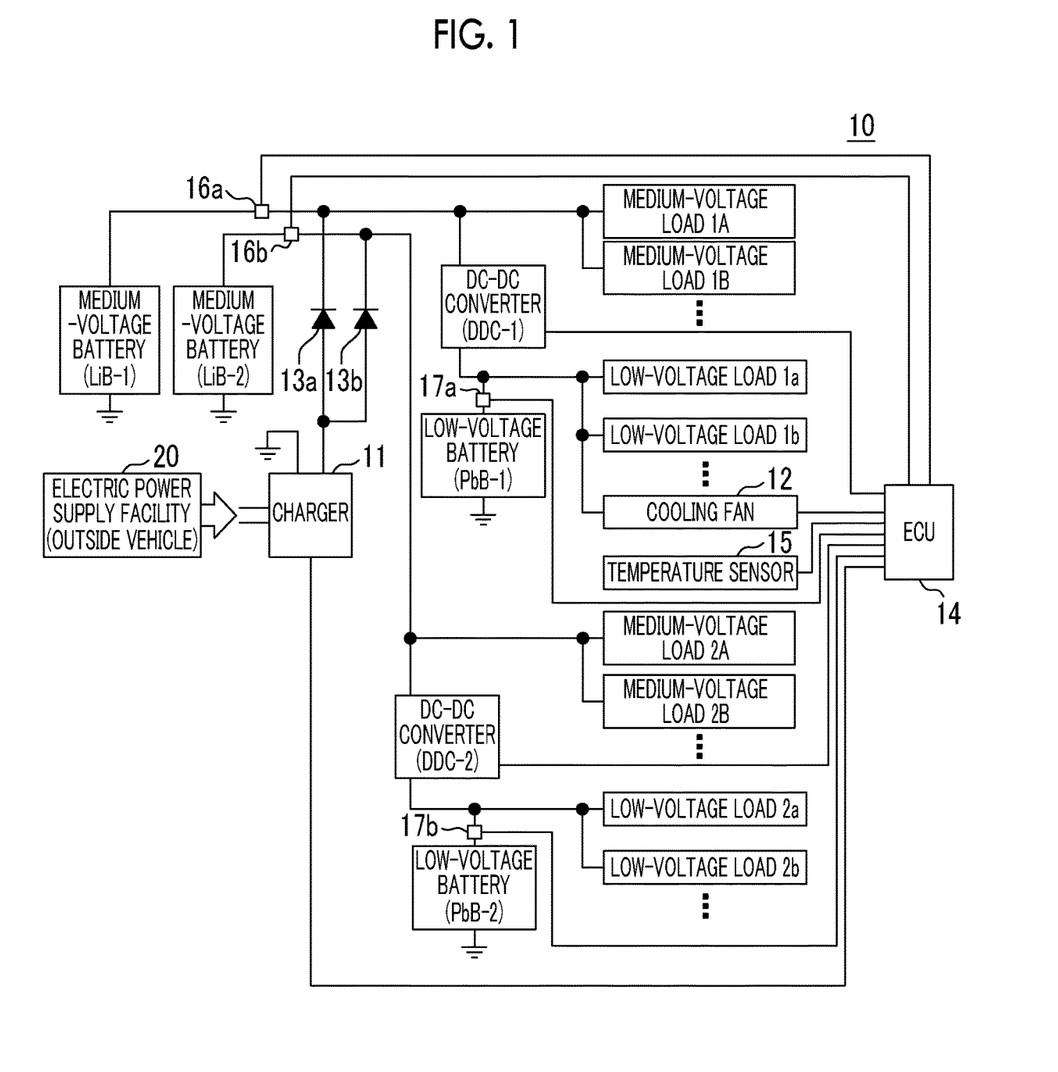
FIG. 1 is a diagram illustrating a system configuration of an electric power supply control system according to an embodiment.

FIG. 1 is a diagram illustrating a system configuration of an electric power supply control system 10 according to the embodiment. The electric power supply control system 10 illustrated in FIG. 1 is mounted in a vehicle such as an automobile and is a system for supplying electric power to each electric device of the vehicle. As illustrated in FIG. 1, the electric power supply control system 10 is configured to include a first electric power supply system, a second electric power supply system, a charger 11, and an ECU 14. The first electric power supply system and the second electric power supply system are electric systems that are independent of each other.

The first electric power supply system is configured to include a medium-voltage system, a low-voltage system, and a DC-DC converter DDC-1 connected between the medium-voltage system and the low-voltage system. The medium-voltage system includes a medium-voltage battery LiB-1 and a plurality of medium-voltage loads 1A, 1B, . . . . The low-voltage system includes a low-voltage battery PbB-1, a plurality of low-voltage loads 1a, 1b, . . . , and a cooling fan 12.

The second electric power supply system is configured to include a medium-voltage system, a low-voltage system, and a DC-DC converter DDC-2 connected between the medium-voltage system and the low-voltage system. The medium-voltage system includes a medium-voltage battery LiB-2 and a plurality of medium-voltage loads 2A, 2B The low-voltage system includes a low-voltage battery PbB-2 and a plurality of low-voltage loads 2a, 2b, . . . .

Each of the medium-voltage batteries LiB-1, LiB-2 is one example of "first secondary battery" and is a lithium-ion battery that supplies electric power having a medium voltage (one example of "first voltage"; for example, 48 V). Each of the low-voltage batteries PbB-1, PbB-2 is one example of "second secondary battery" and is a lead battery that supplies electric power having a low voltage (one example of "second voltage"; for example, 12 V).

In the first electric power supply system, each of the medium-voltage loads 1A, 1B, . . . is one example of "first load" and is an electric device that operates using the electric power of the medium voltage supplied from the medium-voltage battery LiB-1. The cooling fan 12 is one example of "specific load" and is an electric device that operates to cool a predetermined cooling target using the electric power of the low voltage supplied from the low-voltage battery PbB-1. For example, the predetermined cooling target is exemplified by a coolant, and a battery. Each of the low-voltage loads 1a, 1b, . . . is one example of "second load" and is an electric device that operates using the electric power of the low voltage supplied from the low-voltage battery PbB-1. The DC-DC converter DDC-1 converts the electric power of the medium voltage supplied from the medium-voltage battery LiB-1 into the electric power of the low voltage and outputs the electric power of the low voltage to the low-voltage system.

In the second electric power supply system, each of the medium-voltage loads 2A, 2B, . . . is one example of "first load" and is an electric device that operates using the electric power of the medium voltage supplied from the medium-voltage battery LiB-2. Each of the low-voltage loads 2a, 2b, . . . is one example of "second load" and is an electric device that operates using the electric power of the low voltage supplied from the low-voltage battery PbB-2. The DC-DC converter DDC-2 converts the electric power of the medium voltage supplied from the medium-voltage battery LiB-2 into the electric power of the low voltage and outputs the electric power of the low voltage to the low-voltage system.

The charger 11 is connected to the medium-voltage system of the first electric power supply system and the medium-voltage system of the second electric power supply system. The charger 11 outputs electric power supplied from an electric power supply facility 20 outside the vehicle to the medium-voltage system of the first electric power supply system through a diode 13a. Accordingly, the charger 11 can charge the medium-voltage battery LiB-1. The charger 11 outputs the electric power supplied from the electric power supply facility 20 outside the vehicle to the medium-voltage system of the second electric power supply system through a diode 13b. Accordingly, the charger 11 can charge the medium-voltage battery LiB-2. The charger 11 can selectively output electric power to either the first electric power supply system or the second electric power supply system under control of the ECU 14. The charger 11 can output electric power to both of the first electric power supply system and the second electric power supply system at the same time under control of the ECU 14.

The ECU 14 is connected to the DC-DC converter DDC-1, the DC-DC converter DDC-2, the charger 11, and the cooling fan 12. The ECU 14 controls charging of the medium-voltage battery LiB-1 of the first electric power supply system and the medium-voltage battery LiB-2 of the second electric power supply system. For example, when a difference in voltage greater than or equal to a predetermined voltage occurs between the charge voltage of the medium-voltage battery LiB-1 and the charge voltage of the medium-voltage battery LiB-2, the ECU 14 controls the operation of the DC-DC converter DDC-1, the DC-DC converter DDC-2, the charger 11, and the cooling fan 12 in accordance with the magnitude relationship between the charge voltage of the medium-voltage battery LiB-1 and the charge voltage of the medium-voltage battery LiB-2.

Specifically, the ECU 14 performs different controls as illustrated below depending on the magnitude relationship between the charge voltage of the medium-voltage battery LiB-1 and the charge voltage of the medium-voltage battery LiB-2.

When Charge Voltage of Medium-Voltage Battery LiB-1>Charge Voltage of Medium-Voltage Battery LiB-2

For the first electric power supply system, the ECU 14 causes the DC-DC converter DDC-1 to output the electric power of the low voltage to the low-voltage system as usual. The ECU 14 operates the cooling fan 12. Accordingly, the ECU 14 promotes consumption of the electric power of the medium-voltage battery LiB-1, and causes the charge voltage of the medium-voltage battery LiB-1 to promptly reach the charge voltage of the medium-voltage battery LiB-2.

For the second electric power supply system, the ECU 14 causes the DC-DC converter DDC-2 to stop outputting the electric power of the low voltage. Accordingly, the ECU 14 causes the electric power from the charger 11 to be supplied to the medium-voltage battery LiB-2 as much as possible, and causes the charge voltage of the medium-voltage battery LiB-2 to promptly reach the charge voltage of the medium-voltage battery LiB-1.

When the state of charge (SOC; charge percentage) of the low-voltage battery PbB-2 denoted by Pb2 is lower than or equal to a lower limit determinant SOC of the low-voltage battery PbB-2 denoted by PbLw2, the ECU 14 causes the DC-DC converter DDC-2 to resume outputting the electric power of the low voltage. Accordingly, the ECU 14 causes the low-voltage battery PbB-2 to maintain sufficient electric power for operating the low-voltage loads 2a, 2b, . . . .

When Charge Voltage of Medium-Voltage Battery LiB-1<Charge Voltage of Medium-Voltage Battery LiB-2

For the second electric power supply system, the ECU 14 causes the DC-DC converter DDC-2 to convert the electric power of the medium voltage into the electric power of the low voltage, and causes the DC-DC converter DDC-2 to output the electric power of the low voltage to the low-voltage system as usual. Accordingly, the ECU 14 promotes consumption of the electric power of the medium-voltage battery LiB-2, and causes the charge voltage of the medium-voltage battery LiB-2 to promptly reach the charge voltage of the medium-voltage battery LiB-1.

For the first electric power supply system, the ECU 14 causes the DC-DC converter DDC-1 to stop outputting the electric power of the low voltage. The ECU 14 stops the operation of the cooling fan 12. Accordingly, the ECU 14 causes the electric power from the charger 11 to be supplied to the medium-voltage battery LiB-1 as much as possible, and causes the charge voltage of the medium-voltage battery LiB-1 to promptly reach the charge voltage of the medium-voltage battery LiB-2.

When the SOC of the low-voltage battery PbB-1 denoted by Pb1 is lower than or equal to a lower limit determinant SOC of the low-voltage battery PbB-1 denoted by PbLw1, the ECU 14 causes the DC-DC converter DDC-1 to resume outputting the electric power of the low voltage. Accordingly, the ECU 14 causes the low-voltage battery PbB-1 to maintain sufficient electric power for operating the low-voltage loads 1a, 1b, . . . .

When a temperature Tn of any of n cooling targets to be cooled by the cooling fan 12 becomes higher than or equal to a predetermined threshold T2, the ECU 14 resumes the operation of the cooling fan 12. Accordingly, the ECU 14 suppresses overheating of each cooling target to be cooled by the cooling fan 12.

In order to realize such a process, the temperature of each cooling target to be cooled by the cooling fan is input into the ECU 14 from a temperature sensor 15. The voltage value of the medium-voltage battery LiB-1 and the voltage value of the medium-voltage battery LiB-2 are input into the ECU 14 from voltage sensors 16a, 16b. The current value of the low-voltage battery PbB-1 and the current value of the low-voltage battery PbB-2 are input into the ECU 14 from current sensors 17a, 17b.

For example, the ECU 14 is configured to include hardware such as a processor and a storage device. The function of the ECU 14 is realized by the processor executing a program stored in the storage device. For example, the processor is exemplified by a central processing unit (CPU) and a microprocessing unit (MPU). For example, the storage device is exemplified by a read-only memory (ROM) and a random access memory (RAM).

Specific Example (First Example) of Control of ECU 14

A specific example (first example) of control of the ECU 14 according to the embodiment will be described with reference to FIG. 2 and FIG. 3. The control of the ECU 14 will be mainly described in a case where the charge voltage of the medium-voltage battery LiB-1 of the first electric power supply system becomes higher than the charge voltage of the medium-voltage battery LiB-2 of the second electric power supply system by a predetermined voltage or more.

Procedure of Processing of ECU 14

Figure 2:
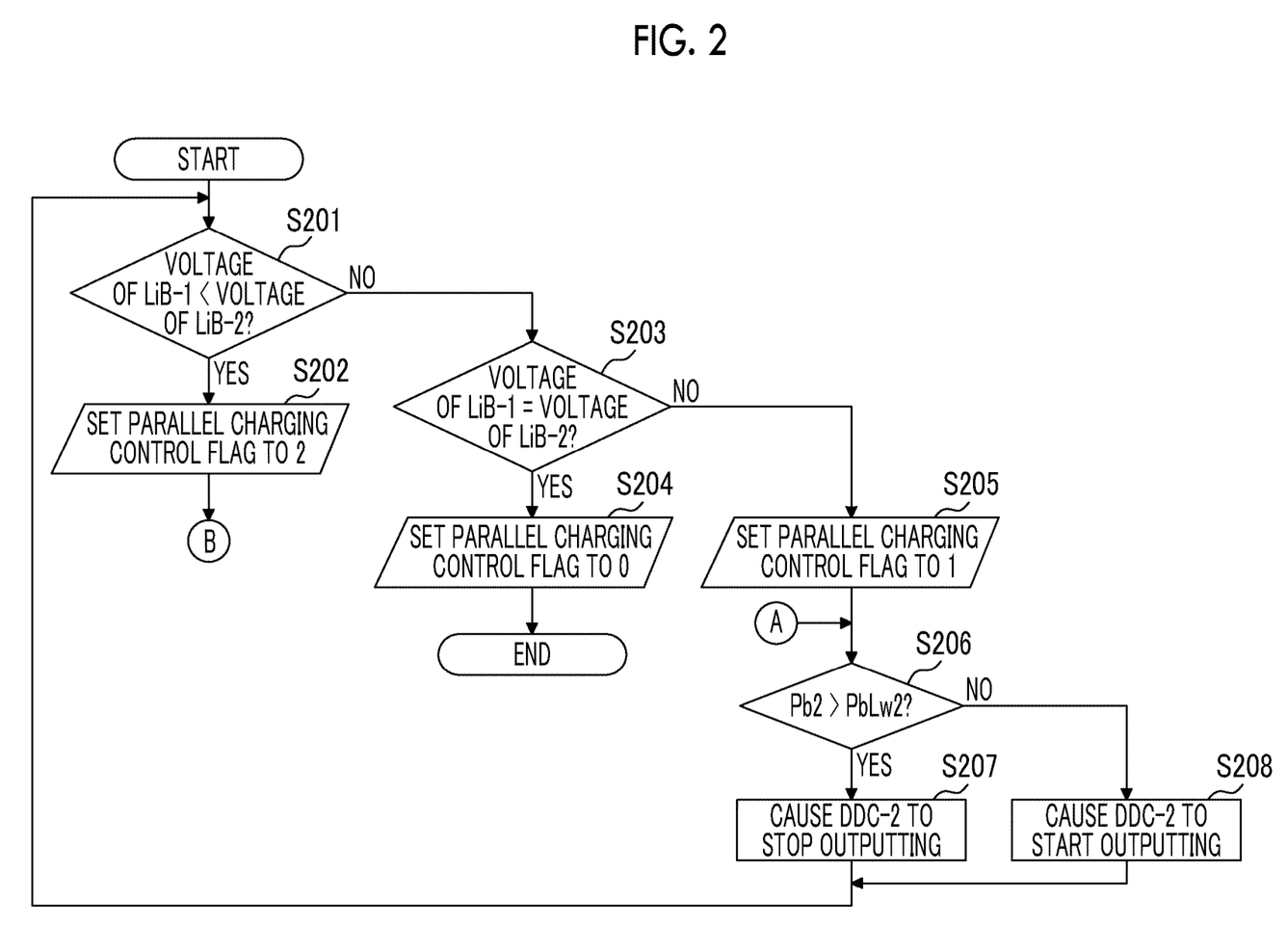
FIG. 2 is a flowchart illustrating a procedure of processing of a controller according to the embodiment.

FIG. 2 is a flowchart illustrating a procedure of processing of the ECU 14 according to the embodiment. For example, the process illustrated in FIG. 2 is executed by the ECU 14 immediately after charging is started by the charger 11.

The ECU 14 determines whether or not the charge voltage of the medium-voltage battery LiB-1 is lower than the charge voltage of the medium-voltage battery LiB-2 by the predetermined voltage or more (step S201). When the ECU 14 in step S201 determines that the charge voltage of the medium-voltage battery LiB-1 is lower than the charge voltage of the medium-voltage battery LiB-2 by the predetermined voltage or more (step S201: YES), the ECU 14 sets a parallel charging control flag to "2" (step S202) and advances the process to B of a flowchart in FIG. 4.

The parallel charging control flag is a flag that can be read and written by the ECU 14. For example, the parallel charging control flag is stored in the memory included in the ECU 14. The parallel charging control flag may be set to "0", "1", or "2" as a setting value. The value "0" means a state where the charge voltage of the medium-voltage battery LiB-1 is equal to the charge voltage of the medium-voltage battery LiB-2. The value "1" means a state where the charge voltage of the medium-voltage battery LiB-1 is higher than the charge voltage of the medium-voltage battery LiB-2 by the predetermined voltage or more. The value "2" means a state where the charge voltage of the medium-voltage battery LiB-1 is lower than the charge voltage of the medium-voltage battery LiB-2 by the predetermined voltage or more. In the present embodiment, it is considered that "the charge voltage of the medium-voltage battery LiB-1 is equal to the charge voltage of the medium-voltage battery LiB-2" when the difference in voltage between the charge voltage of the medium-voltage battery LiB-1 and the charge voltage of the medium-voltage battery LiB-2 is less than the predetermined voltage.

When the ECU 14 in step S201 determines that the charge voltage of the medium-voltage battery LiB-1 is not lower than the charge voltage of the medium-voltage battery LiB-2 by the predetermined voltage or more (step S201: NO), the ECU 14 determines whether or not the charge voltage of the medium-voltage battery LiB-1 is equal to the charge voltage of the medium-voltage battery LiB-2 (step S203). When the ECU 14 in step S203 determines that the charge voltage of the medium-voltage battery LiB-1 is equal to the charge voltage of the medium-voltage battery LiB-2 (step S203: YES), the ECU 14 sets the parallel charging control flag to "0" (step S204) and finishes the process.

When the ECU 14 in step S203 determines that the charge voltage of the medium-voltage battery LiB-1 is not equal to the charge voltage of the medium-voltage battery LiB-2 (step S203: NO), the ECU 14 sets the parallel charging control flag to "1" (step S205). The ECU 14 determines whether or not the SOC of the low-voltage battery PbB-2 denoted by Pb2 is higher than the lower limit determinant SOC of the low-voltage battery PbB-2 denoted by PbLw2 (step S206).

When the ECU 14 in step S206 determines that Pb2 is higher than PbLw2 (step S206: YES), the ECU 14 causes the DC-DC converter DDC-2 to stop outputting the electric power of the low voltage (step S207). Accordingly, the ECU 14 causes the electric power from the charger 11 to be supplied to the medium-voltage battery LiB-2 as much as possible, and causes the charge voltage of the medium-voltage battery LiB-2 to promptly reach the charge voltage of the medium-voltage battery LiB-1. When the DC-DC converter DDC-2 has already stopped outputting the electric power of the low voltage, the ECU 14 maintains the stoppage state. The process of the ECU 14 returns to step S201.

When the ECU 14 in step S206 determines that Pb2 is not higher than PbLw2 (step S206: NO), the ECU 14 causes the DC-DC converter DDC-2 to start outputting the electric power of the low voltage (step S208). Accordingly, the ECU 14 causes the low-voltage battery PbB-2 to maintain sufficient electric power for operating the low-voltage loads 2a, 2b, . . . . When the DC-DC converter DDC-2 has already been outputting the electric power of the low voltage, the ECU 14 maintains the output state. The process of the ECU 14 returns to step S201.

Operation Timing in Electric Power Supply Control System 10

Figure 3:
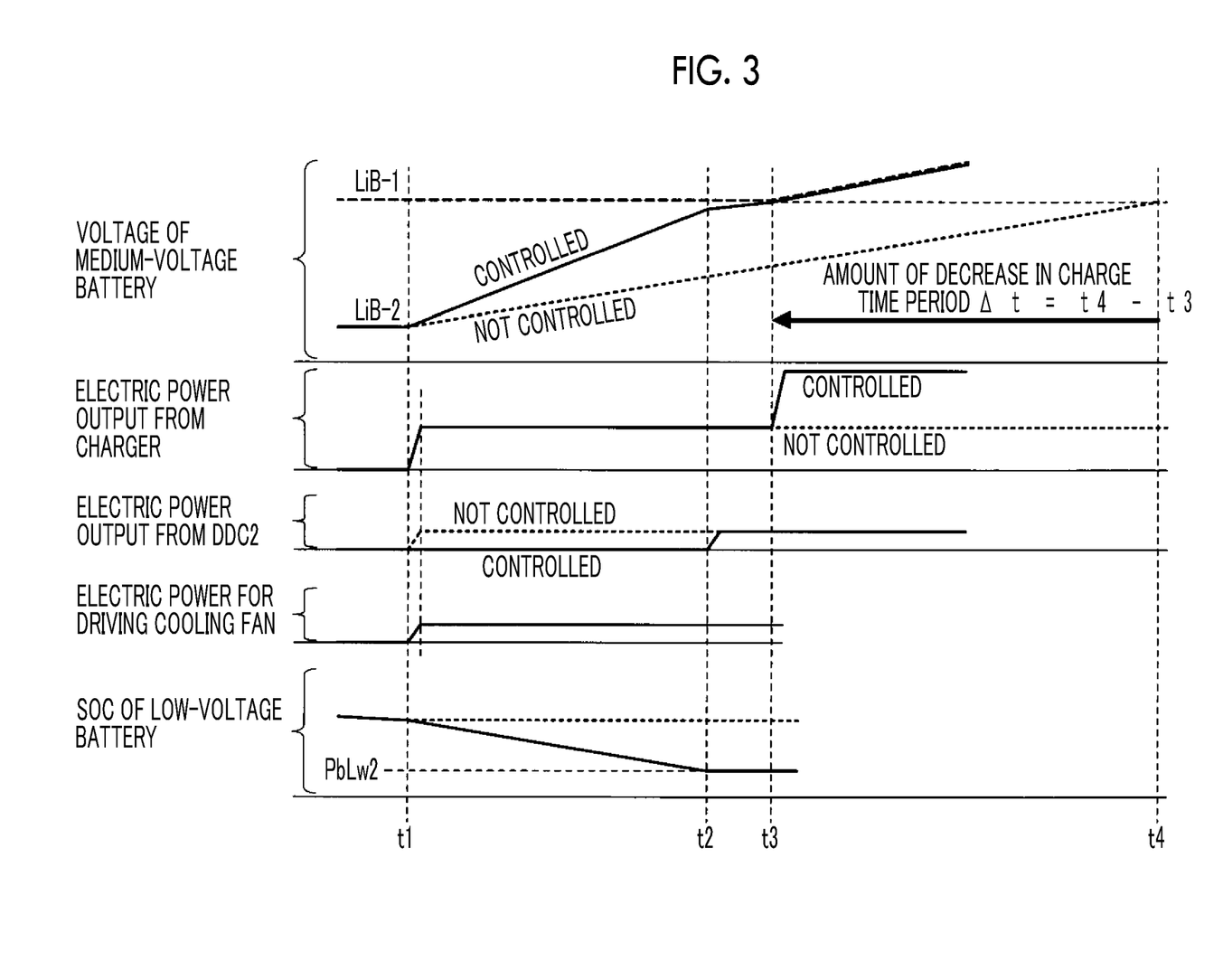
FIG. 3 is a timing chart illustrating an operation timing in the electric power supply control system according to the embodiment.

FIG. 3 is a timing chart illustrating an operation timing in the electric power supply control system 10 according to the embodiment.

The charger 11 starts charging the medium-voltage battery LiB-2 (timing t1 in FIG. 3). At such a time, the ECU 14 causes the charger 11 to output electric power to merely the second electric power supply system. The ECU 14 causes the DC-DC converter DDC-2 to stop outputting the electric power of the low voltage. The ECU 14 operates the cooling fan 12 of the first electric power supply system as usual. Accordingly, compared to a technology in the related art (where the present control is not performed), the amount of electric power supplied to the medium-voltage battery LiB-2 is increased, and the amount of electric power consumed from the medium-voltage battery LiB-1 is increased. Thus, the difference in voltage between the charge voltage of the medium-voltage battery LiB-1 and the charge voltage of the medium-voltage battery LiB-2 is promptly decreased.

Then, when the SOC of the low-voltage battery PbB-2 denoted by Pb2 becomes lower than or equal to the lower limit determinant SOC of the low-voltage battery PbB-2 denoted by PbLw2 (timing t2 in FIG. 3), the ECU 14 causes the DC-DC converter DDC-2 to resume outputting the electric power of the low voltage. Accordingly, the ECU 14 causes the low-voltage battery PbB-2 to maintain sufficient electric power for operating the low-voltage loads 2a, 2b, . . . .

When the difference in voltage between the charge voltage of the medium-voltage battery LiB-1 and the charge voltage of the medium-voltage battery LiB-2 is eliminated (timing t3 in FIG. 3), the control of the ECU 14 is finished. Here, as illustrated in FIG. 3, the time period for charging the medium-voltage battery LiB-2 taken by the present control (refer to "CONTROLLED" in FIG. 3) is shorter by $\Delta t$ ($\Delta t=t4-t3$) than the time period for charging the medium-voltage battery LiB-2 taken by a charging method of the technology in the related art (refer to "NOT CONTROLLED" in FIG. 3).

Specific Example (Second Example) of Control of ECU 14

A specific example (second example) of control of the ECU 14 according to the embodiment will be described with reference to FIG. 4 and FIG. 5. The control of the ECU 14 will be mainly described in a case where the charge voltage of the medium-voltage battery LiB-1 of the first electric power supply system becomes lower than the charge voltage of the medium-voltage battery LiB-2 of the second electric power supply system by the predetermined voltage or more.

Procedure of Processing of ECU 14

Figure 4:
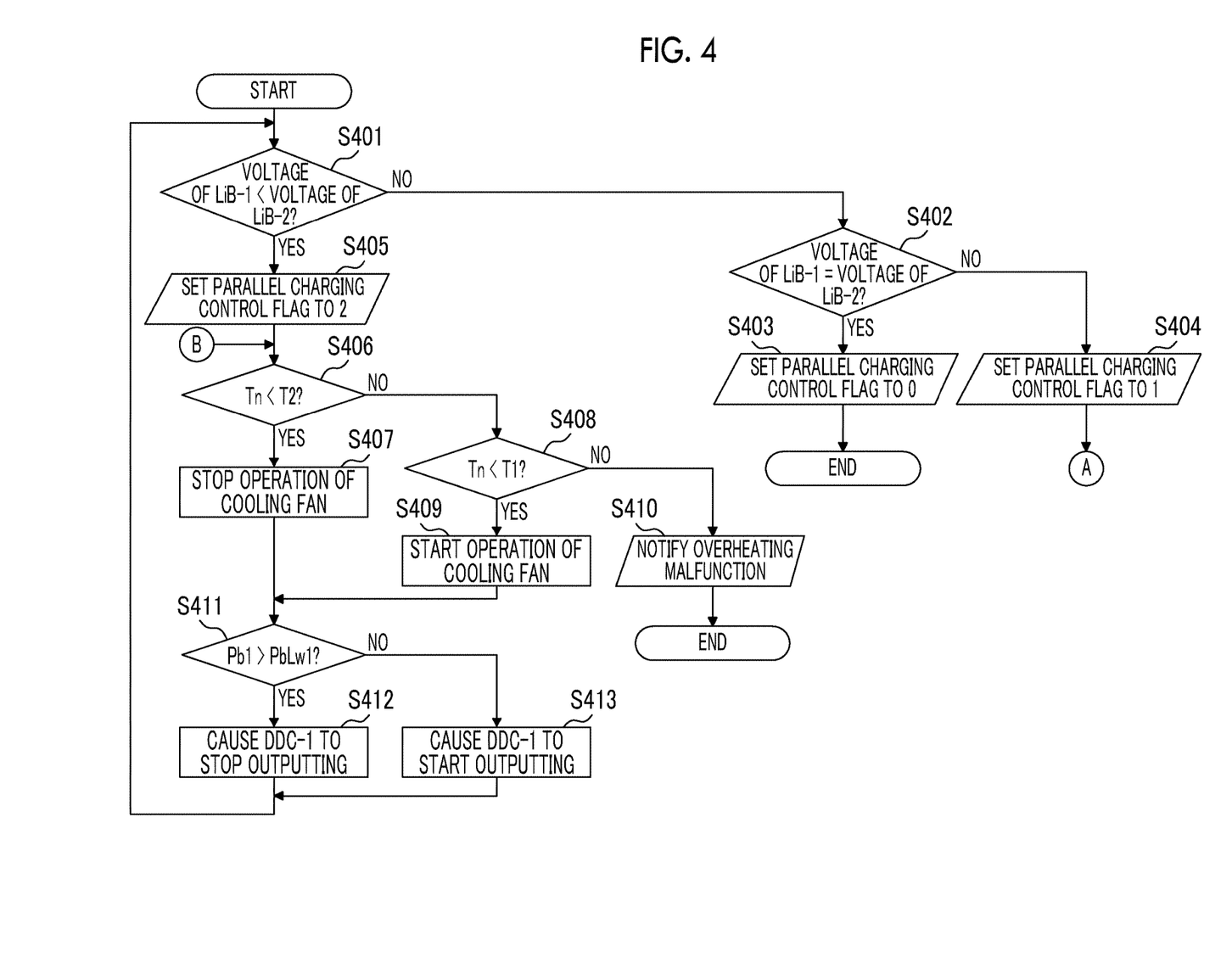
FIG. 4 is a flowchart illustrating a procedure of processing of the controller according to the embodiment.

FIG. 4 is a flowchart illustrating a procedure of processing of the ECU 14 according to the embodiment. For example, the process illustrated in FIG. 4 is executed by the ECU 14 immediately after charging is started by the charger 11.

The ECU 14 determines whether or not the charge voltage of the medium-voltage battery LiB-1 is lower than the charge voltage of the medium-voltage battery LiB-2 by the predetermined voltage or more (step S401).

When the ECU 14 in step S401 determines that the charge voltage of the medium-voltage battery LiB-1 is not lower than the charge voltage of the medium-voltage battery LiB-2 by the predetermined voltage or more (step S401: NO), the ECU 14 determines whether or not the charge voltage of the medium-voltage battery LiB-1 is equal to the charge voltage of the medium-voltage battery LiB-2 (step S402). When the ECU 14 in step S402 determines that the charge voltage of the medium-voltage battery LiB-1 is equal to the charge voltage of the medium-voltage battery LiB-2 (step S402: YES), the ECU 14 sets the parallel charging control flag to "0" (step S403) and finishes the process. When the ECU 14 in step S402 determines that the charge voltage of the medium-voltage battery LiB-1 is not equal to the charge voltage of the medium-voltage battery LiB-2 (step S402: NO), the ECU 14 sets the parallel charging control flag to "1" (step S404) and advances the process to A of the flowchart in FIG. 2.

When the ECU 14 in step S401 determines that the charge voltage of the medium-voltage battery LiB-1 is lower than the charge voltage of the medium-voltage battery LiB-2 by the predetermined voltage or more (step S401: YES), the ECU 14 sets the parallel charging control flag to "2" (step S405). The ECU 14 determines whether or not the temperature Tn of any of the n cooling targets to be cooled by the cooling fan 12 is lower than the predetermined threshold T2 (step S406).

When the ECU 14 in step S406 determines that the temperature Tn is lower than the threshold T2 (step S406: YES), the ECU 14 stops the operation of the cooling fan 12 (step S407). Accordingly, the ECU 14 causes the electric power from the charger 11 to not be consumed by the cooling fan 12. When the operation of the cooling fan 12 has already been stopped, the ECU 14 maintains the stoppage state. The ECU 14 advances the process to step S411.

When the ECU 14 in step S406 determines that the temperature Tn is not lower than the threshold T2 (step S406: NO), the ECU 14 determines whether or not the temperature Tn of any of the n cooling targets to be cooled by the cooling fan 12 is lower than a predetermined threshold T1 (T1>T2) (step S408).

When the ECU 14 in step S408 determines that the temperature Tn is lower than the threshold T1 (step S408: YES), the ECU 14 starts the operation of the cooling fan 12 (step S409). Accordingly, the ECU 14 suppresses overheating of each cooling target to be cooled by the cooling fan 12. When the operation of the cooling fan 12 has already been started, the ECU 14 maintains the operating state. The ECU 14 advances the process to step S411.

When the ECU 14 in step S408 determines that the temperature Tn is not lower than the threshold T1 (step S408: NO), the ECU 14 provides a notification that an overheating malfunction occurs in the cooling target (step S410), and the ECU 14 finishes the process.

In step S411, the ECU 14 determines whether or not the SOC of the low-voltage battery PbB-1 denoted by Pb1 is higher than the lower limit determinant SOC of the low-voltage battery PbB-1 denoted by PbLw1.

When the ECU 14 in step S411 determines that Pb1 is higher than PbLw1 (step S411: YES), the ECU 14 causes the DC-DC converter DDC-1 to stop outputting the electric power of the low voltage (step S412). Accordingly, the ECU 14 causes the electric power from the charger 11 to be supplied to the medium-voltage battery LiB-1 as much as possible, and causes the charge voltage of the medium-voltage battery LiB-1 to promptly reach the charge voltage of the medium-voltage battery LiB-2. When the DC-DC converter DDC-1 has already stopped outputting the electric power of the low voltage, the ECU 14 maintains the stoppage state. The process of the ECU 14 returns to step S401.

When the ECU 14 in step S411 determines that Pb1 is not higher than PbLw1 (step S411: NO), the ECU 14 causes the DC-DC converter DDC-1 to start outputting the electric power of the low voltage (step S413). Accordingly, the ECU 14 causes the low-voltage battery PbB-1 to maintain sufficient electric power for operating the low-voltage loads 1a, 1b, . . . . When the DC-DC converter DDC-1 has already been outputting the electric power of the low voltage, the ECU 14 maintains the output state. The process of the ECU 14 returns to step S401.

Operation Timing in Electric Power Supply Control system 10

Figure 5:
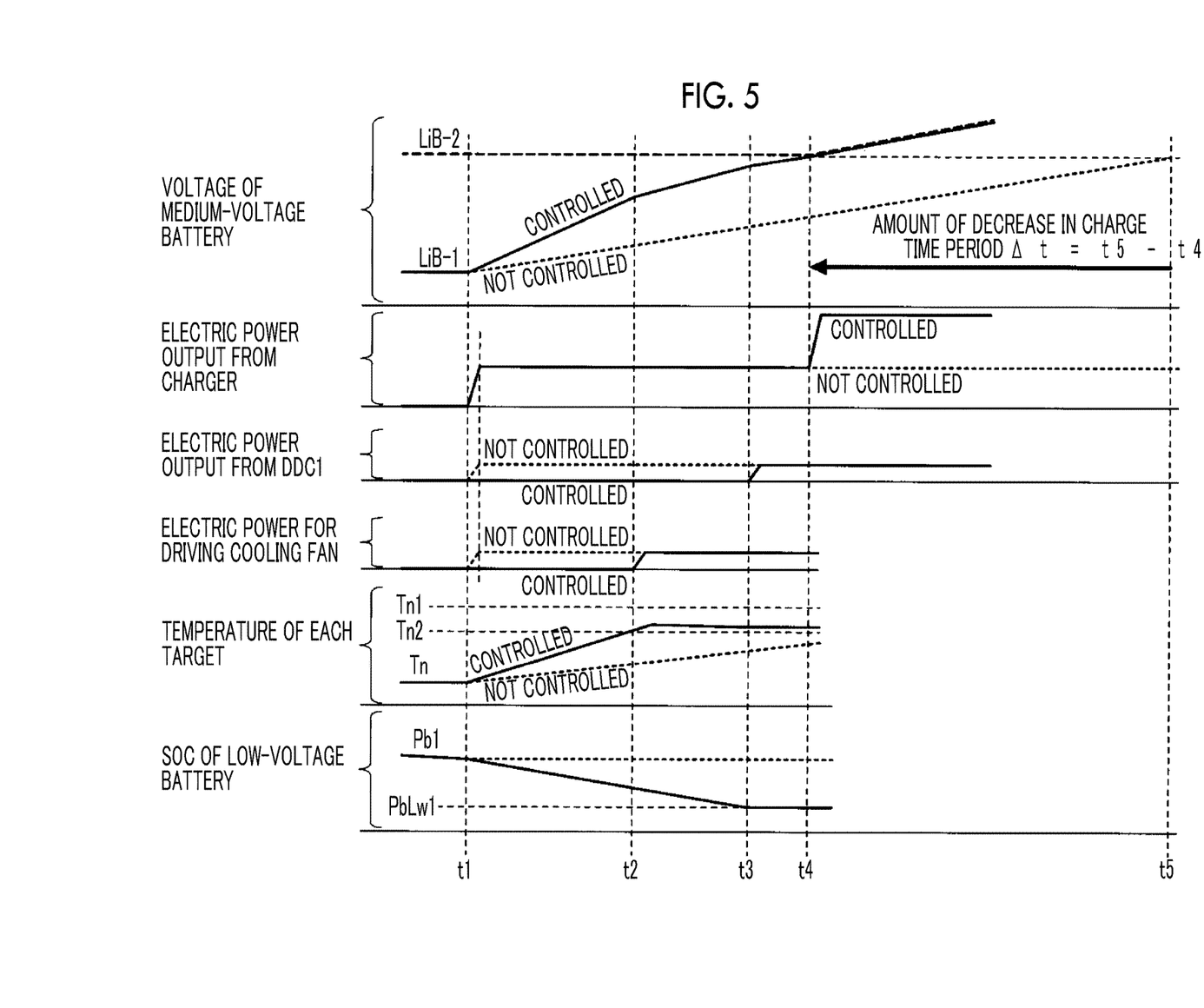
FIG. 5 is a timing chart illustrating an operation timing in the electric power supply control system according to the embodiment.

FIG. 5 is a timing chart illustrating an operation timing in the electric power supply control system 10 according to the embodiment.

The charger 11 starts charging the medium-voltage battery LiB-1 (timing t1 in FIG. 5). At such a time, the ECU 14 causes the charger 11 to output electric power to merely the first electric power supply system. The ECU 14 causes the DC-DC converter DDC-1 to stop outputting the electric power of the low voltage. The ECU 14 stops the operation of the cooling fan 12 of the first electric power supply system. Accordingly, compared to the technology in the related art (where the present control is not performed), the amount of electric power supplied to the medium-voltage battery LiB-1 is increased, and the amount of electric power consumed from the medium-voltage battery LiB-2 is increased. Thus, the difference in voltage between the charge voltage of the medium-voltage battery LiB-1 and the charge voltage of the medium-voltage battery LiB-2 is promptly decreased.

Then, when the temperature Tn of any of the n cooling targets to be cooled by the cooling fan 12 becomes higher than or equal to the predetermined threshold T2 (timing t2 in FIG. 5), the ECU 14 resumes the operation of the cooling fan 12 of the first electric power supply system. Accordingly, the ECU 14 suppresses overheating of each cooling target to be cooled by the cooling fan 12.

Then, when the SOC of the low-voltage battery PbB-1 denoted by Pb1 becomes lower than or equal to the lower limit determinant SOC of the low-voltage battery PbB-1 denoted by PbLw1 (timing t3 in FIG. 5), the ECU 14 causes the DC-DC converter DDC-1 to resume outputting the electric power of the low voltage. Accordingly, the ECU 14 causes the low-voltage battery PbB-1 to maintain sufficient electric power for operating the low-voltage loads 1$a$, 1$b$, . . . .

When the difference in voltage between the charge voltage of the medium-voltage battery LiB-1 and the charge voltage of the medium-voltage battery LiB-2 is eliminated (timing t4 in FIG. 5), the control of the ECU 14 is finished. Here, as illustrated in FIG. 5, the time period for charging the medium-voltage battery LiB-1 taken by the present control (refer to "CONTROLLED" in FIG. 5) is shorter by Δt (Δt=t5−t4) than the time period for charging the medium-voltage battery LiB-1 taken by the charging method of the technology in the related art (refer to "NOT CONTROLLED" in FIG. 5).

As described thus far, when the charge voltage of the medium-voltage battery LiB-1 of the first electric power supply system becomes higher than the charge voltage of the medium-voltage battery LiB-2 of the second electric power supply system by the predetermined voltage or more, the electric power supply control system 10 according to the present embodiment causes the DC-DC converter DDC-1 to output the electric power of the low voltage and operates the cooling fan 12 for the first electric power supply system. For the second electric power supply system, the electric power supply control system 10 causes the DC-DC converter DDC-2 to stop outputting the electric power of the low voltage. Accordingly, consumption of the electric power of the medium-voltage battery LiB-1 is promoted, and the electric power from the charger 11 is supplied to the medium-voltage battery LiB-2 as much as possible. Therefore, the electric power supply control system 10 according to the present embodiment can promptly eliminate the difference in voltage between the first electric power supply system and the second electric power supply system.

When the charge voltage of the medium-voltage battery LiB-2 of the second electric power supply system becomes higher than the charge voltage of the medium-voltage battery LiB-1 of the first electric power supply system by the predetermined voltage or more, the electric power supply control system 10 according to the present embodiment causes the DC-DC converter DDC-2 to output the electric power of the low voltage for the second electric power supply system. For the first electric power supply system, the electric power supply control system 10 causes the DC-DC converter DDC-1 to stop outputting the electric power of the low voltage and stops the operation of the cooling fan 12. Accordingly, consumption of the electric power of the medium-voltage battery LiB-2 is promoted, and the electric power from the charger 11 is supplied to the medium-voltage battery LiB-1 as much as possible. Therefore, the electric power supply control system 10 according to the present embodiment can promptly eliminate the difference in voltage between the first electric power supply system and the second electric power supply system.

While an exemplary embodiment of the present disclosure is described in detail thus far, the present disclosure is not limited to the embodiment. Various modifications or changes can be made within the scope of the gist of the present disclosure disclosed in the claims.

For example, the embodiment may be modified as in first to tenth modification examples illustrated below. In the first to third modification examples (FIG. 6 to FIG. 8), changes from the embodiment will be described. The same constituents as the embodiment will be designated with the same reference signs as the embodiment and will not be described.

FIRST MODIFICATION EXAMPLE

Figure 6:
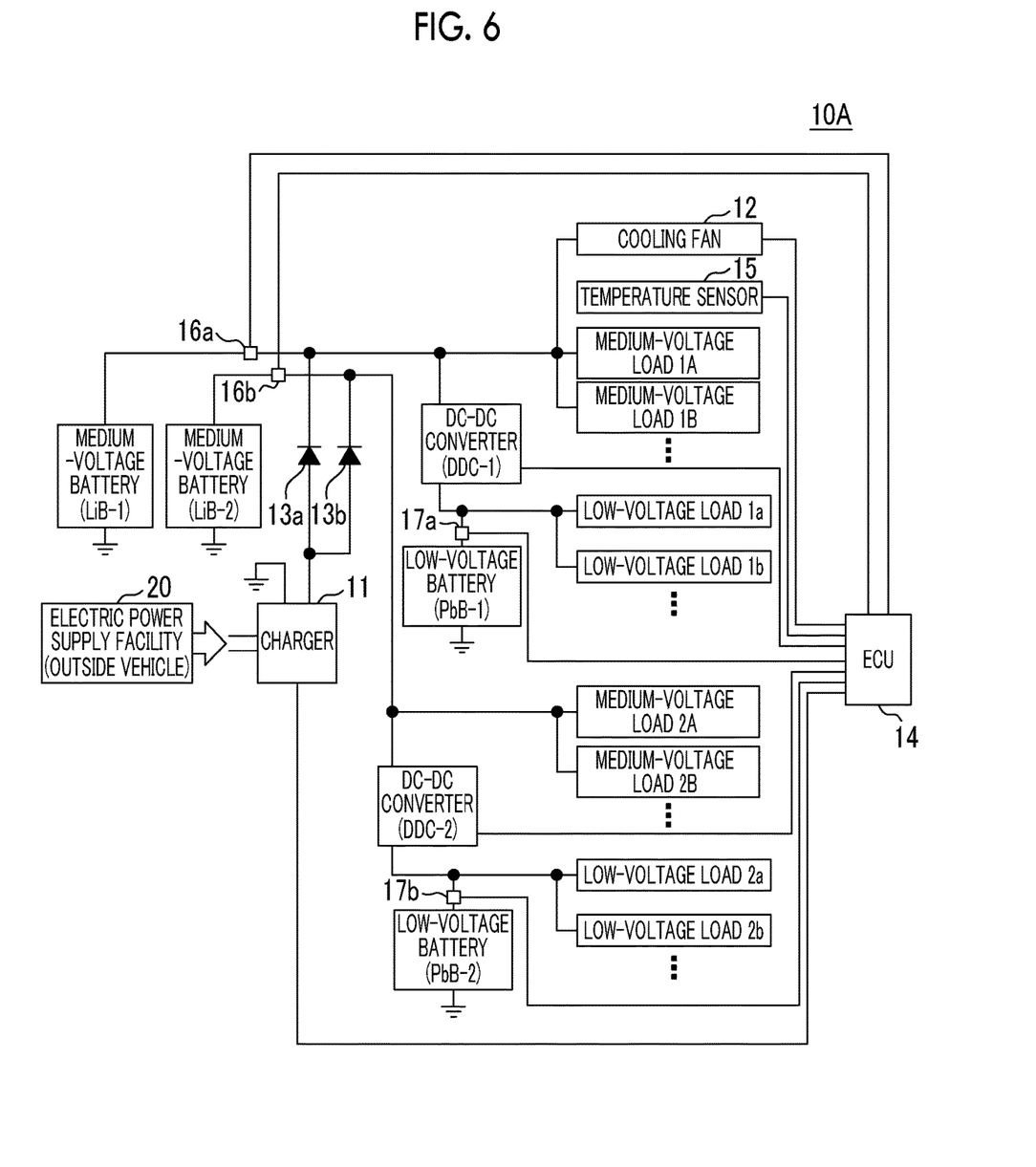
FIG. 6 is a diagram illustrating a system configuration of an electric power supply control system according to a first modification example.

FIG. 6 is a diagram illustrating a system configuration of an electric power supply control system 10A according to the first modification example. While the cooling fan 12 is disposed as one example of "specific load" in the low-voltage system in the electric power supply control system 10 of the embodiment (FIG. 1), the cooling fan 12 is disposed in the medium-voltage system in the electric power supply control system 10A of the first modification example (FIG. 6). While the cooling fan 12 as "specific load" may be disposed in the medium-voltage system to which the medium-voltage battery LiB-1 belongs, the cooling fan 12 may be disposed in a voltage system other than the medium-voltage system. In either case, consumption of the electric power of the medium-voltage battery LiB-1 can be promoted by operating the cooling fan 12, and a decrease in the amount of charging electric power supplied to the medium-voltage battery LiB-1 can be suppressed by stopping the cooling fan 12.

SECOND MODIFICATION EXAMPLE

Figure 7:
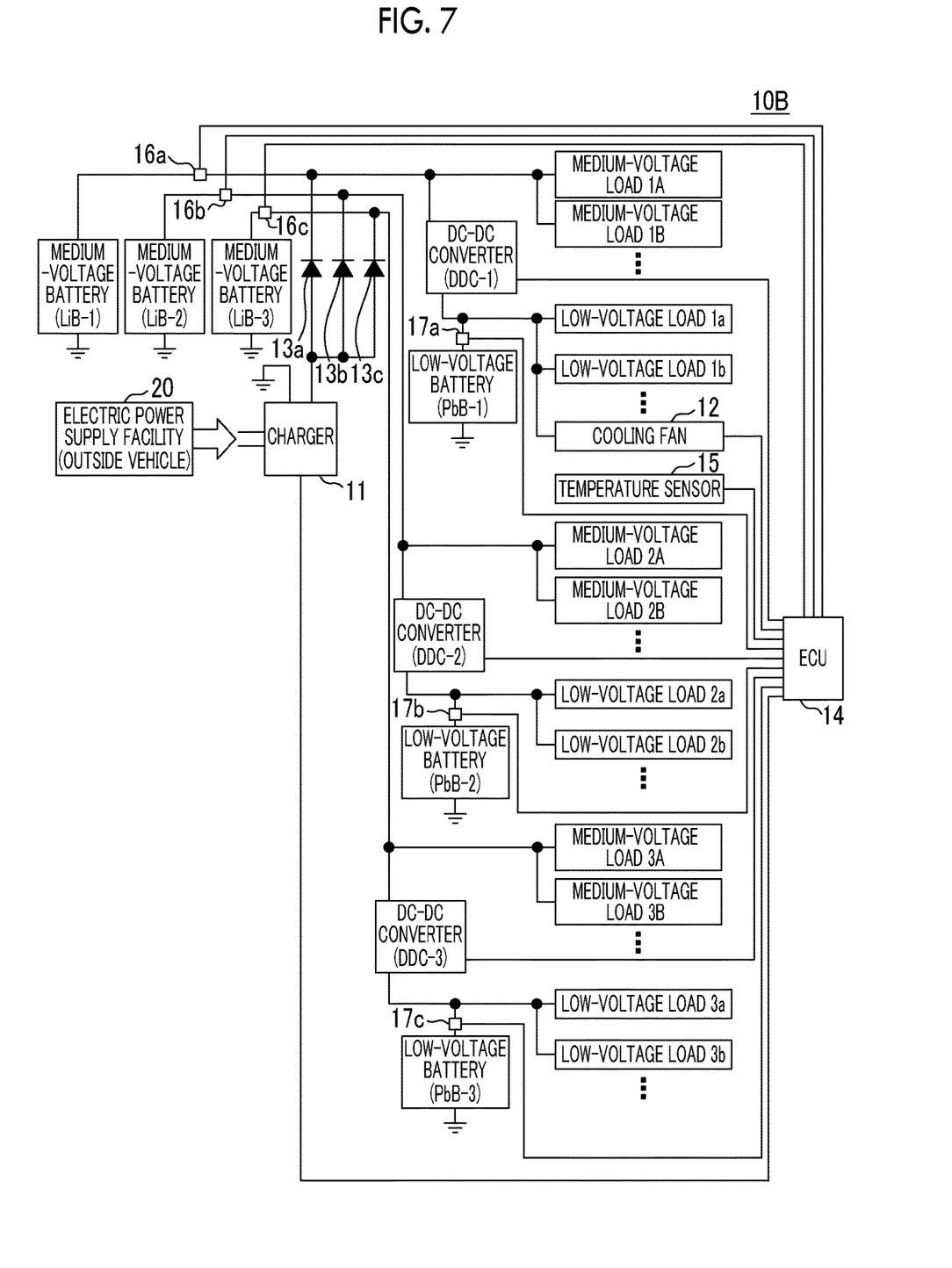
FIG. 7 is a diagram illustrating a system configuration of an electric power supply control system according to a second modification example.

FIG. 7 is a diagram illustrating a system configuration of an electric power supply control system 10B according to the second modification example. While the electric power supply control system 10 of the embodiment (FIG. 1) is configured to include two electric power supply systems (the first electric power supply system and the second electric power supply system), the electric power supply control system 10B of the second modification example (FIG. 7) is configured to include three electric power supply systems (the first electric power supply system, the second electric power supply system, and a third electric power supply system).

In the same manner as the second electric power supply system, the third electric power supply system is configured to include a medium-voltage system, a low-voltage system, and a DC-DC converter DDC-3 connected between the medium-voltage system and the low-voltage system. The medium-voltage system includes a medium-voltage battery LiB-3 and a plurality of medium-voltage loads 3A, 3B, . . . . The low-voltage system includes a low-voltage battery PbB-3 and a plurality of low-voltage loads 3$a$, 3$b$, . . . .

In the same manner as controlling charging of the medium-voltage battery LiB-2, the ECU 14 can control charging of the medium-voltage battery LiB-3 of the third electric power supply system by controlling the output of the electric power of the low voltage from the DC-DC converter DDC-3. Thus, the voltage value of the medium-voltage battery LiB-3 is input into the ECU 14 from a voltage sensor 16c. The current value of the low-voltage battery PbB-3 is input into the ECU 14 from a current sensor 17c.

According to the second modification example, for example, when there is a difference in voltage of more than or equal to the predetermined voltage between the charge voltage of the medium-voltage battery LiB-1 and the charge voltage of the medium-voltage battery LiB-2 or the medium-voltage battery LiB-3, the difference in voltage between the charge voltage of the medium-voltage battery LiB-1 and the charge voltage of the medium-voltage battery LiB-2 or the medium-voltage battery LiB-3 can be promptly eliminated by performing the same charging control as the charging control described in the embodiment.

Accordingly, the number of "the electric power supply systems" is not limited to two and may be three or more.

THIRD MODIFICATION EXAMPLE

Figure 8:
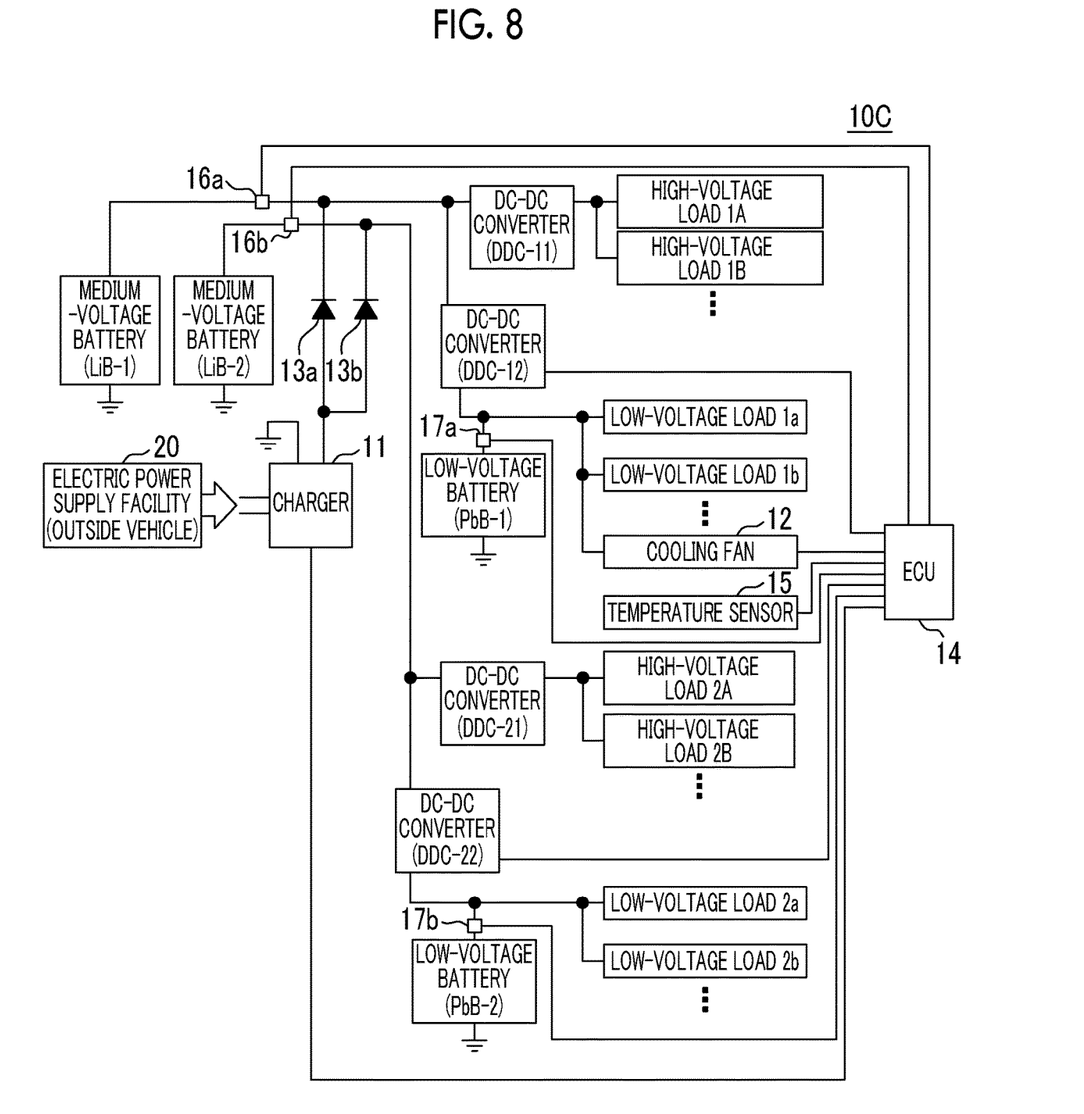
FIG. 8 is a diagram illustrating a system configuration of an electric power supply control system according to a third modification example.

FIG. 8 is a diagram illustrating a system configuration of an electric power supply control system 10C according to the third modification example. While the medium-voltage loads 1A, 1B, . . . are used as one example of "first load" in the first electric power supply system in the electric power supply control system 10 of the embodiment (FIG. 1), a plurality of high-voltage loads 1A, 1B, . . . that is connected to the medium-voltage battery LiB-1 (one example of "first secondary battery") through a DC-DC converter DDC-11 is used as one example of "first load" in the first electric power supply system in the electric power supply control system 10C of the third modification example (FIG. 8).

Similarly, while the medium-voltage loads 2A, 2B, . . . are used as one example of "first load" in the second electric power supply system in the electric power supply control system 10 of the embodiment (FIG. 1), a plurality of high-voltage loads 2A, 2B, . . . that is connected to the medium-voltage battery LiB-2 (one example of "first secondary battery") through a DC-DC converter DDC-21 is included as one example of "first load" in the second electric power supply system in the electric power supply control system 10C of the third modification example (FIG. 8).

While "first load" that is operated using the electric power supplied from the medium-voltage batteries LiB-1, LiB-2 may be disposed in the medium-voltage system to which the medium-voltage batteries LiB-1, LiB-2 belong, "first load" may be disposed in a voltage system other than the medium-voltage system.

FOURTH MODIFICATION EXAMPLE

While a lithium-ion battery is used as one example of "first secondary battery" in the electric power supply control system 10 of the embodiment (FIG. 1), the present disclosure is not limited thereto. For example, other batteries (for example, a lead battery and a nickel-hydrogen battery) or high-capacity capacitors may be used. While a lead battery is used as one example of "second secondary battery" in the electric power supply control system 10 of the embodiment (FIG. 1), the present disclosure is not limited thereto. For example, other batteries (for example, a lithium-ion battery and a nickel-hydrogen battery) or high-capacity capacitors may be used.

FIFTH MODIFICATION EXAMPLE

While a difference in voltage between two medium-voltage batteries is eliminated by charging one medium-voltage battery with the electric power output from the charger 11 in the electric power supply control system 10 of the embodiment (FIG. 1), the present disclosure is not limited thereto. The difference in voltage between two medium-voltage batteries may be eliminated by charging one medium-voltage battery with electric power output from other electric power supply sources (for example, an alternator and a fuel cell).

SIXTH MODIFICATION EXAMPLE

While the cooling fan 12 is used as one example of "specific load" in the electric power supply control system 10 of the embodiment (FIG. 1), the present disclosure is not limited thereto. For example, other loads (for example, a headlight and a water pump) may be used as "specific load". Even when any load is used as "specific load", consumption of the electric power of the medium-voltage battery LiB-1 can be promoted by operating the load, and a decrease in the amount of charging electric power supplied to the medium-voltage battery LiB-1 can be suppressed by stopping the operation of the load.

SEVENTH MODIFICATION EXAMPLE

The description "stop the operation of the cooling fan 12" in the embodiment may be considered as "decrease the level of output from the cooling fan 12". Even in such a case, a decrease in the amount of charging electric power supplied to the medium-voltage battery LiB-1 can be suppressed. The description "start the operation of the cooling fan 12" in the embodiment may be considered as "increase the level of output from the cooling fan 12" when the cooling fan 12 has already been operating. Even in such a case, consumption of the electric power of the medium-voltage battery LiB-1 can be promoted.

The description "cause the DC-DC converters DDC-1, DDC-2 to stop outputting" in the embodiment may be considered as "decrease the level of output from the DC-DC converters DDC-1, DDC-2". Even in such a case, a decrease in the amount of charging electric power supplied to the medium-voltage batteries LiB-1, LiB-2 can be suppressed. The description "start the operation of the DC-DC converters DDC-1, DDC-2" in the embodiment may be considered as "increase the level of output from the DC-DC converters DDC-1, DDC-2" when the DC-DC converters DDC-1, DDC-2 has already started outputting electric power. Even in such a case, consumption of the electric power of the medium-voltage batteries LiB-1, LiB-2 can be promoted.

EIGHTH MODIFICATION EXAMPLE

While the cooling fan 12 as "specific load" is disposed in merely the first electric power supply system in the embodiment, the cooling fan 12 may be additionally disposed in the second electric power supply system as "specific load". Alternatively, a load other than the cooling fan 12 may be additionally disposed in the second electric power supply system as "specific load". In either case, when the charge voltage of the medium-voltage battery LiB-2 becomes higher than the charge voltage of the medium-voltage battery LiB-1 by the predetermined voltage or more, consumption of the electric power of the medium-voltage battery LiB-2 can be promoted by operating "specific load" of the second electric power supply system. When the charge voltage of the medium-voltage battery LiB-2 becomes lower than the charge voltage of the medium-voltage battery LiB-1 by the predetermined voltage or more, a decrease in the amount of charging electric power supplied to the medium-voltage battery LiB-2 can be suppressed by stopping the operation of "specific load" of the second electric power supply system.

NINTH MODIFICATION EXAMPLE

"First secondary battery" is not limited to a secondary battery that supplies the electric power of the so-called medium voltage. For example, "first secondary battery" may be a secondary battery that supplies the electric power of the so-called high voltage or low voltage. "Second secondary battery" is not limited to a secondary battery that supplies the electric power of the so-called low voltage. For example, "second secondary battery" may be a secondary battery that supplies the electric power of the so-called medium voltage or high voltage. "First secondary battery" and "second secondary battery" are not limited to a lithium-ion battery and a lead battery. For example, "first secondary battery" and "second secondary battery" may be high-capacity capacitors.

TENTH MODIFICATION EXAMPLE

While the function of "controller" is realized by one ECU 14 in the embodiment, the present disclosure is not limited thereto. For example, an ECU may be disposed per control target (for example, per battery, per DC-DC converter, and per cooling fan) in a vehicle electric power supply control system. In such a case, the function of "controller" may be realized by cooperation between the ECUs per control target.

The determination performed based on the battery voltage or the charge voltage in the embodiment may be performed based on the SOC, the time period for charging or discharging, a map, and the like. The determination of "charge percentage" may be performed based on the battery voltage, the charge voltage, the current value, the time period for charging, the map, and the like other than the SOC.

What is claimed is:

1. An electric power supply control system comprising:
    a plurality of electric power supply systems, each of the electric power supply systems including
    a first secondary battery configured to supply electric power of a first voltage,
    a first load configured to operate using the electric power supplied from the first secondary battery,
    a second secondary battery configured to supply electric power of a second voltage that is a voltage lower than the first voltage,
    a second load configured to operate using the electric power supplied from the second secondary battery, and
    a DC-DC converter connected between i) the first secondary battery and the first load, and ii) the second secondary battery and the second load; and
    a controller connected to the electric power supply systems,
    wherein when a charge voltage of the first secondary battery of a first electric power supply system that is any one of the electric power supply systems becomes higher than the charge voltage of the first secondary battery of an electric power supply system other than the first electric power supply system by a first predetermined voltage or more, the controller is configured to increase a level of output from a specific load in the first electric power supply system.

2. The electric power supply control system according to claim 1, wherein when a charge voltage of the first secondary battery of a second electric power supply system that is any one of the electric power supply systems becomes lower than the charge voltage of the first secondary battery of an electric power supply system other than the second electric power supply system by a second predetermined voltage or more, the controller is configured to decrease the level of output from a specific load in the second electric power supply system.

3. The electric power supply control system according to claim 2, wherein:
    the specific load is a cooling fan; and
    when a temperature of a cooling target to be cooled by the cooling fan exceeds a predetermined threshold after a level of output from the cooling fan is decreased, the controller is configured to increase the level of output from the cooling fan.

4. The electric power supply control system according to claim 2, wherein:
    the specific load is a cooling fan; and
    when a temperature of a cooling target to be cooled by the cooling fan exceeds a predetermined threshold after output from the cooling fan is stopped, the controller is configured to start output from the cooling fan.

5. The electric power supply control system according to claim 1, wherein when a charge voltage of the first secondary battery of a second electric power supply system that is any one of the electric power supply systems becomes lower than the charge voltage of the first secondary battery of an electric power supply system other than the second electric power supply system by a third predetermined voltage or more, the controller is configured to decrease a level of output from the DC-DC converter in the second electric power supply system.

6. The electric power supply control system according to claim 5, wherein when a charge percentage of the second secondary battery connected to the DC-DC converter is lower than a predetermined threshold after the level of output from the DC-DC converter is decreased, the controller is configured to increase the level of output from the DC-DC converter.

7. The electric power supply control system according to claim 1, wherein:
    the first load is a medium-voltage load that operates using electric power of a medium voltage;
    the second load is a low-voltage load that operates using electric power of a lower voltage than the electric power of the medium voltage; and
    the specific load is disposed in a low-voltage system that includes the low-voltage load.

8. The electric power supply control system according to claim 1, wherein:
    the first load is a medium-voltage load that operates using electric power of a medium voltage;
    the second load is a low-voltage load that operates using electric power of a lower voltage than the electric power of the medium voltage; and
    the specific load is disposed in a medium-voltage system that includes the medium-voltage load.

9. The electric power supply control system according to claim 1, further comprising a second DC-DC converter connected between the first secondary battery and the first load, wherein:
    the first load is a high-voltage load that operates using electric power of a high voltage;

the second load is a low-voltage load that operates using electric power of a lower voltage than the electric power of the high voltage; and the specific load is disposed in a low-voltage system that includes the low-voltage load.

\* \* \* \* \*